No. 766,334. PATENTED AUG. 2, 1904.
H. A. EWALD.
AUTOMATIC STEAM WHISTLE.
APPLICATION FILED JAN. 28, 1904.
NO MODEL.
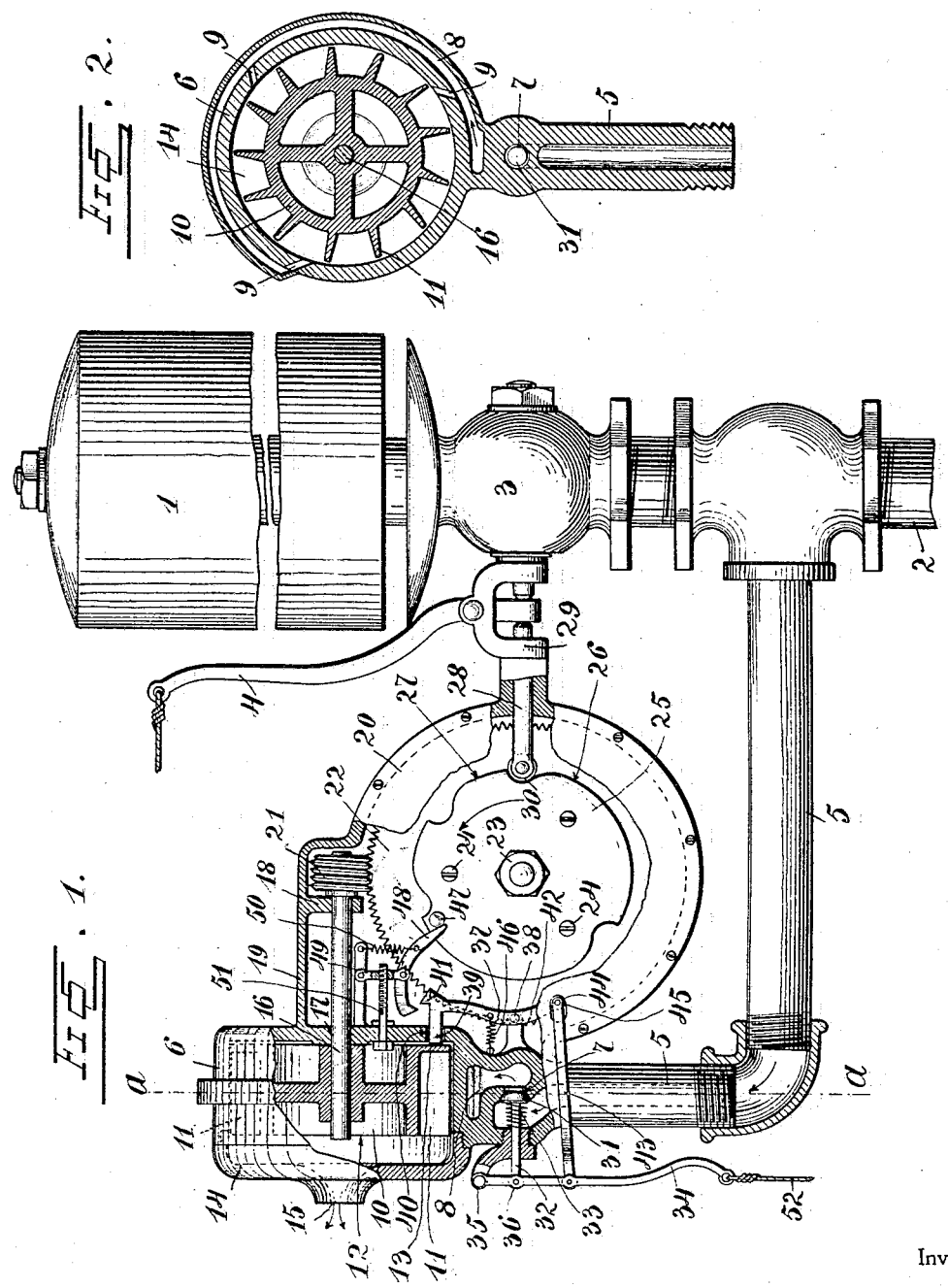
Witnesses
Inventor
Herman A. Ewald
By H. B. Willson
Attorney No. 766,334. Patented August 2, 1904.

UNITED STATES PATENT OFFICE.

HERMAN A. EWALD, OF LEROY, WISCONSIN.

AUTOMATIC STEAM-WHISTLE.

SPECIFICATION forming part of Letters Patent No. 766,334, dated August 2, 1904.

Application filed January 28, 1904. Serial No. 191,058. (No model.)

*To all whom it may concern:*

Be it known that I, HERMAN A. EWALD, a citizen of the United States, residing at Leroy, in the county of Dodge and State of Wisconsin, have invented certain new and useful Improvements in Automatic Steam-Whistles; and I do declare the following to be a full, clear, and exact description of the invention, such as will enable others skilled in the art to which it appertains to make and use the same.

My invention is an improved automatically-operated steam-whistle of the kind used on locomotives; and it consists in the construction, combination, and arrangement of devices hereinafter described and claimed.

The object of my invention is to provide improved mechanism for automatically operating a locomotive or other steam whistle for sounding the requisite number of blasts, as two long blasts and two short blasts, for a crossing or any desired number and length of blasts.

In the accompanying drawings, Figure 1 is an elevation, partly in section, of a locomotive-whistle embodying my improvements. Fig. 2 is a detail sectional view taken on the plane indicated by the line $a\,a$ of Fig. 1.

The whistle 1 is here shown as of the usual construction. It may be of any suitable construction and is provided with a pipe 2 for supplying steam thereto. 3 is the usual valve, which may be operated by a lever 4. A cord may be attached to this lever and extended to the locomotive-cab to enable the engineer to manually operate the lever 4, and hence sound the whistle.

My improved mechanism for automatically sounding the required number of blasts on the whistle is described as follows: The steam-pipe 5 branches from the pipe 2 and leads to a cylindrical casing 6 and is provided with a valve-seat 7 and a steam-conduit 8, leading from the said valve-seat, which conduit extends around one side of the casing and communicates therewith by inlet-channels 9, which are disposed tangentially thereto. Within the casing is a rotary piston 10, provided with tangentially-disposed wings 11, located at its periphery, which wings are substantially at right angles with reference to the steam-inlet channel 9, so that the steam issuing from the latter will strike full against said wings and serve to rotate the piston, as will be understood. One side of the piston, which I will call the "outer" side thereof, is open, as at 12. The opposite side of its peripheral portion is closed, as at 13, by an annular web, which closes the space between the wings on the inner side of the rotary piston. The casing 6 has a cap 14, which is screwed to the outer side thereof and is provided with a central opening 15, which forms a port for the escape of the exhaust-steam.

The rotary piston is fast to and is mounted on a shaft 16, which has one of its bearings 17 in the casing 6 and has its other bearing 18 in an angular offset portion 19 of an otherwise circular or cylindical casing 20. Also rigidly secured to the said shaft 16 is a worm 21. A worm-gear 22 is mounted, as at 23, for rotation in the casing 20, engages and is rotated by the worm 21 when the rotary piston is in operation, and on one side of the said worm-gear, here shown as secured thereto by screws 24, is a cam-wheel 25, which is here shown as provided with two relatively long cam-faces 26 and two relatively short cam-faces 27, corresponding to the required two long and two short blasts to be sounded by the whistle by the automatic operation of the whistle-operating apparatus. The operating-rod 28 is disposed in a bracket-arm 29, that connects the casing 20 to the valve-casing 3. One end of this rod bears against the shorter arm of the lever 4 and the other end thereof, which is disposed within the casing 20, is provided with an antifriction-roller 30, which bears on the periphery of the cam-wheel 25. A valve 31, which is here shown as a cone-valve, operates to close or open the valve-seat 7 and is provided with an outwardly-extending stem 32, on which is a spring 33, the latter acting to normally close the valve. The lever 34, which may be of the form here shown or of any other suitable construction, is pivotally connected to the casing 6 at 35 and is connected to the valve-stem 32, as at 36. A brake or detent lever 37 is fulcrumed at 38, has a shoe 39, which extends through an opening 40 in one side of the casing 6, and is adapted to frictionally bear against the web of the rotary piston to prevent the latter from rotating. This brake-lever or detent is provided with the locking-shoulder 41 and with an arm 42. The latter is connected to the lever 34 by a link-rod 43, which is curved outwardly to clear the steam-pipe 5. The connection between said link-rod and said arm 42 is effected by a bolt 44, which runs through a cylindrical antifriction-sleeve 45, the latter operating in a slot in one side of the casing 20. A spring 46 acts on the brake or detent lever 37 to engage the latter frictionally with the rotary piston 10, and this spring coacts with the spring 33, which serves to normally close the valve 31 to cut off the supply of steam to the casing in which the rotary piston operates. The cam-wheel is provided with a pin 47, which is located at an appropriate point and turns with the said cam-wheel. A locking-arm 48 is pivoted to to a pivoted link 49 and at one end is adapted to engage the shoulder 41 of the detent or brake lever 37 to lock the latter in disengaged position against the tension of its spring 46. The outer end of the said locking-arm projects into the path of the pin 47. A spring 50 is connected to the said locking-arm and serves to normally hold it in position to engage the shoulder of the brake or detent lever. The link 48 is engaged and adjusted by a set-screw 51, which is swiveled to the head or side of the casing 6 and which when turned serves to adjust the locking-arm with relation to the detent or brake lever to insure its engagement with the shoulder 41 thereof. The lever 34 may be manually operated by a cord 52, attached thereto, to open the valve 31, and hence admit steam to the motor to operate the latter. Steam being thus admitted and the motor or engine started in operation, the worm 21 causes the worm-gear 22 to rotate and carry the cam-wheel 25 with it, the cam-faces of the lever coacting with the rod 28 and the lever 4 to open the valve 3 of the whistle, and thereby cause the two long and two short blasts desired to be sounded by the whistle. It will be understood that the movement of the lever 34 in opening the valve 31 also releases the detent or brake lever 37 from the rotary piston, leaving the latter free to rotate, and this movement of the detent or brake lever causes its shoulder to be engaged by the locking-arm 48, so that the said detent or brake lever is held in disengaged position against the tension of its spring 46 until the cam-wheel after having operated the whistle as required completes a rotation, thereby bringing the pin 47 into engagement with the locking-arm. As the pin engages the locking-arm it releases the latter from the shoulder of the detent or brake lever, and thereupon the coacting springs 33 and 46 serve to close the valve 31 and to simultaneously apply the shoe of the brake or detent lever to the rotary piston, thereby at once cutting off the supply of steam thereto and preventing it from rotating. The set-screw enables the position of the locking-arm and detent or brake lever to be predetermined, so that the lever 34 when operated will open the valve 33 to a desired extent to admit steam in such volumes as to drive the motor at a desired rate of speed and to sound the blasts on the whistle within a desired period of time.

It will be apparent that by altering the construction of the cam-wheel the same may be caused to sound any desired number of blasts by the whistle at a single rotation.

My improved rotary motor, comprising the casing having the plurality of steam-inlets and the rotary piston having the peripheral wings disposed at substantially right angles to the said steam-inlets, may be employed as a rotary engine for any suitable purpose. I do not desire to limit myself to its use in connection with an automatically-operating device for sounding a locomotive-whistle; neither do I desire to limit myself to the precise construction and combination of devices herein described, as it is evident that modifications may be made therein without departing from the spirit of my invention and within the scope of the appended claims.

Having thus described my invention, what I claim, and desire to secure by Letters Patent, is—

1. In apparatus of the class described, the combination of a cam-wheel, whistle-valve-operating means actuated thereby, a motor to operate the cam-wheel, a detent device to pretermit the operation of the cam-wheel, and a locking-arm coacting with said detent device, said locking-arm being automatically tripped by the operation of the cam-wheel.

2. In apparatus of the class described, the combination of a revoluble cam-wheel, and a whistle-valve-operating device actuated thereby, with a fluid-pressure-operated motor having a moving element and a feed-valve, a lever to open the latter, a brake-lever to engage and lock the moving element of the motor, a connection between said brake-lever and said valve-operating lever to open the valve and release the moving element of the motor simultaneously, springs to effect a reverse movement of said brake-lever and valve, a locking element to engage the brake-lever and lock the latter in released position, and means carried by the cam-wheel to trip said locking element, and thereby release said brake-lever, substantially as described.

3. In combination with a steam-motor having a feed-valve, and a whistle-regulating valve, mechanism driven by the motor to operate the whistle-valve, and an automatic brake mechanism to stop the motor and thereby pretermit the operation of the automatic whistle-operating means.

4. In combination with a motor having a feed-valve, and a spring-pressed lever to operate the latter, a brake device operated by the lever, and coacting with an element of the motor to pretermit the operation of the lever, a spring to normally apply the brake, whistle-operating means driven by the motor, a spring-actuated locking element released by the whistle-operating means when the motor is in operation and serving when thus released, to release the brake, the latter serving to return the locking element to position for reengagement by the whistle-operating means when the valve-lever is released.

In testimony whereof I have hereunto set my hand in presence of two subscribing witnesses.

HERMAN A. EWALD.

Witnesses:
   C. W. LAMOREUX,
   ARNO A. EWALD.